(12) United States Patent
Chen

(10) Patent No.: US 8,089,772 B2
(45) Date of Patent: Jan. 3, 2012

(54) MOBILE ELECTRONIC DEVICE WITH SIDE BUTTON MODULE

(75) Inventor: Ming-Pin Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/489,821

(22) Filed: Jun. 23, 2009

(65) Prior Publication Data

US 2010/0232122 A1    Sep. 16, 2010

(30) Foreign Application Priority Data

Mar. 13, 2009    (CN) .................... 2009 2 0301251 U

(51) Int. Cl.
*H05K 5/02* (2006.01)

(52) U.S. Cl. ...... 361/752; 361/730; 174/520; 455/575.1

(58) Field of Classification Search .................. 361/752, 361/730; 455/575.1, 575.3, 575.4; 174/520
See application file for complete search history.

(56) References Cited

U.S. PATENT DOCUMENTS

| | | | | | |
|---|---|---|---|---|---|
| 5,003,133 | A | * | 3/1991 | Kobayashi et al. | 200/5 A |
| 5,455,743 | A | * | 10/1995 | Miyajima | 361/781 |
| 5,749,457 | A | * | 5/1998 | Castaneda et al. | 200/343 |
| 6,148,183 | A | * | 11/2000 | Higdon et al. | 455/575.1 |
| 6,963,039 | B1 | * | 11/2005 | Weng et al. | 200/302.1 |
| 7,217,898 | B2 | * | 5/2007 | Chien et al. | 200/339 |
| 7,383,066 | B2 | * | 6/2008 | Park | 455/575.1 |
| 7,492,602 | B2 | * | 2/2009 | Kim et al. | 361/752 |
| 7,554,050 | B1 | * | 6/2009 | Lv | 200/339 |
| 7,656,675 | B2 | * | 2/2010 | Kim et al. | 361/752 |
| 7,884,297 | B2 | * | 2/2011 | Okuzumi | 200/339 |

* cited by examiner

*Primary Examiner* — Dameon Levi
(74) *Attorney, Agent, or Firm* — Altis Law Group, Inc.

(57) ABSTRACT

A mobile electronic device is provided. The mobile electronic device includes a case having a sidewall; a circuit board mounted in the case, and a side button module attached to the case sidewall. The circuit board includes a switch disposed thereon. The side button module includes a positioning member secured to the case sidewall and a button secured to the positioning member. The button includes a base and an actuating protrusion protruding from the base. The base abuts the positioning member. The actuating protrusion extends through the positioning member and is configured to trigger the switch on the circuit board when actuated. The positioning member is sandwiched between the base and the actuating protrusion.

17 Claims, 8 Drawing Sheets

MOBILE ELECTRONIC DEVICE WITH SIDE BUTTON MODULE

BACKGROUND

1. Technical Field

The present disclosure relates to mobile electronic devices, and particularly, to a mobile electronic device with a side button module.

2. Description of Related Art

Some button functions of a mobile device are usually provided by a side button module mounted to a side of the mobile electronic device. Conventionally, one kind of side button modules is configured to be formed by a plastic button and a rubber sheet. The plastic button is jointed to the rubber sheet by adhesives. However, the plastic button is easy detached from the rubber sheet due to the adhesives strength and durability.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
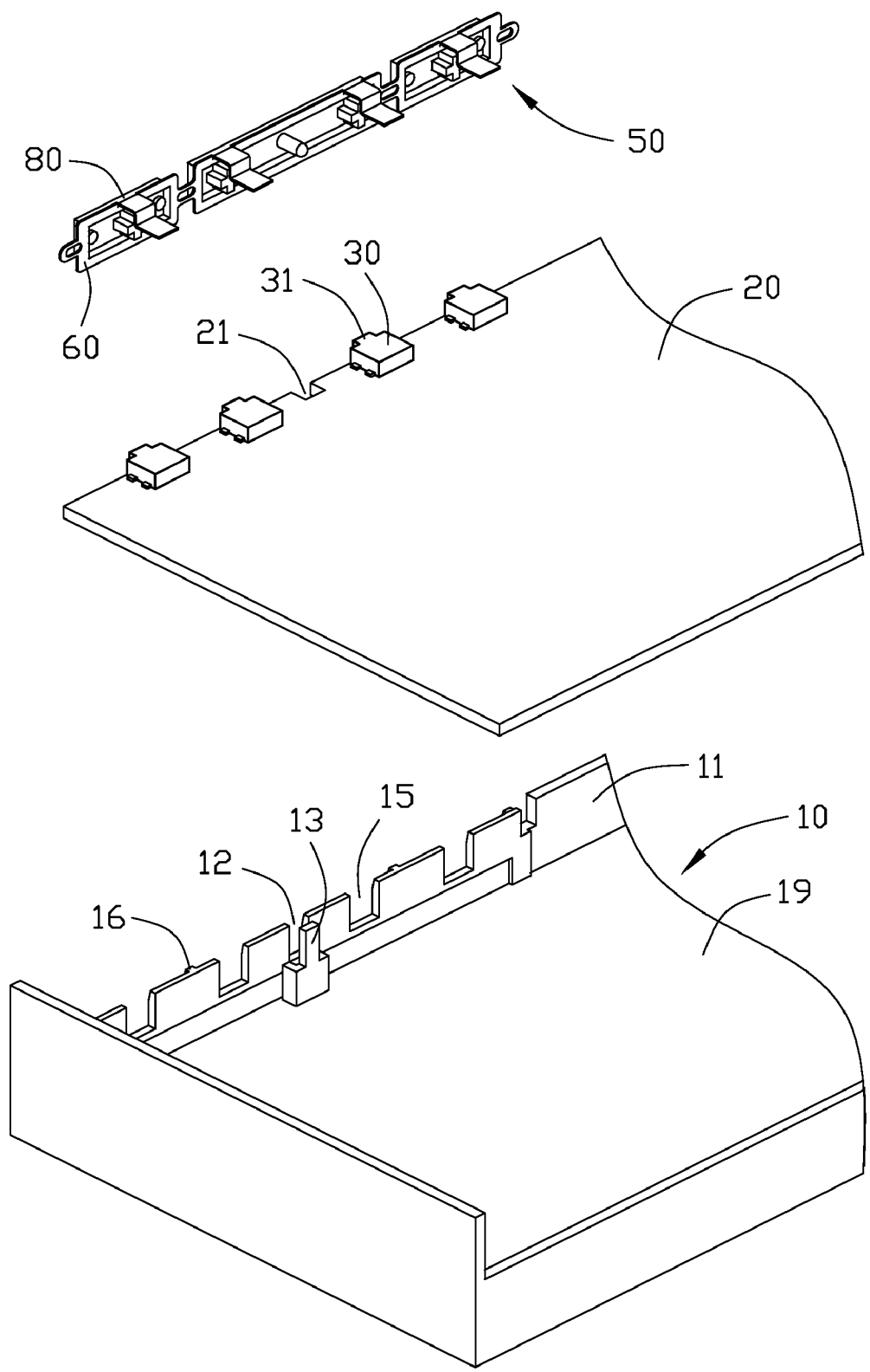
FIG. 1 is an exploded, isometric view of one embodiment of a mobile electronic device.
Figure 2:
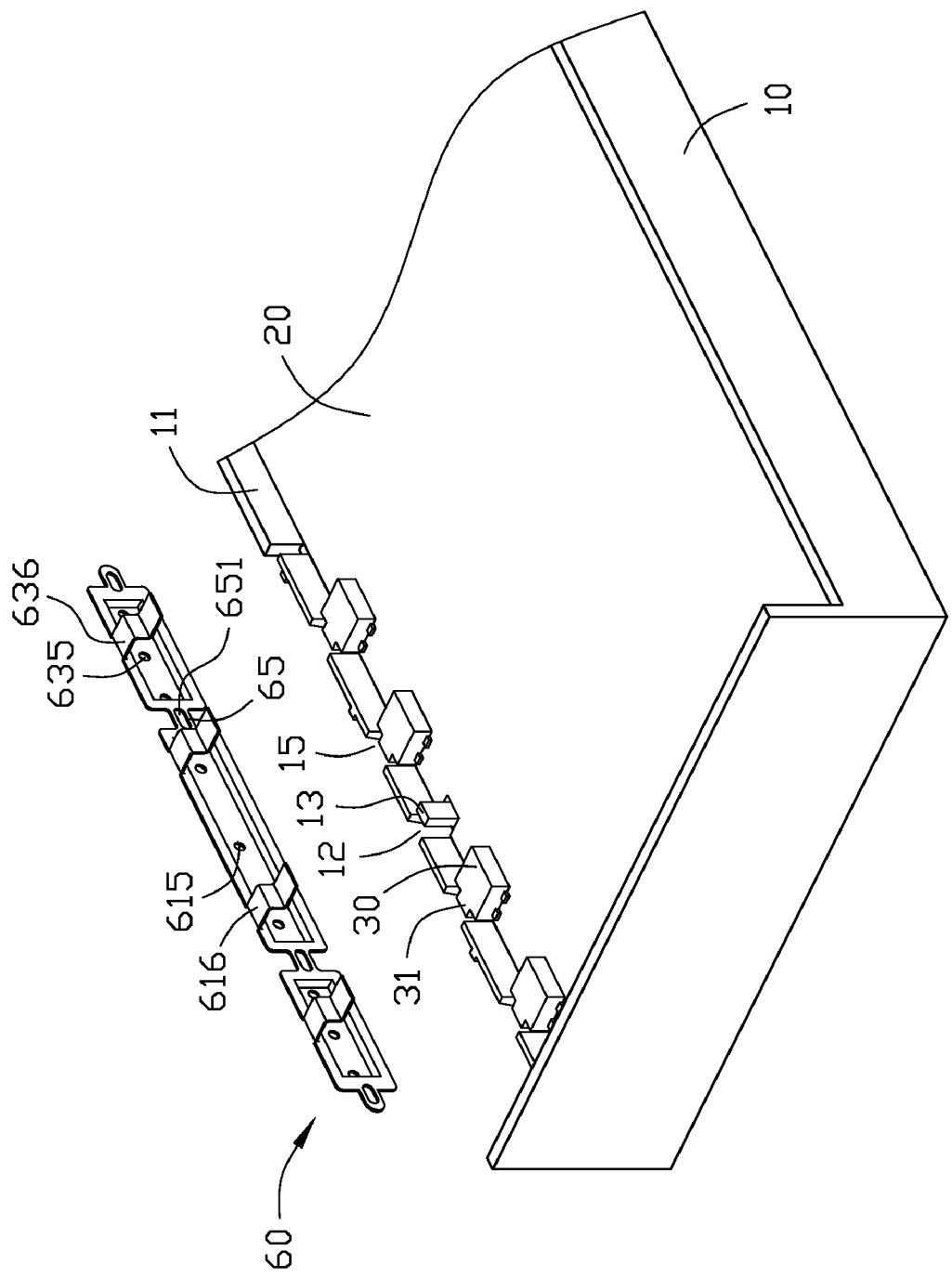
FIG. 2 is an exploded, isometric view of the mobile electronic device of FIG. 1, showing the circuit board and the case assembled, with the button sheets not shown.

Referring to FIG. 1, one embodiment of a mobile electronic device includes a case 10, a circuit board 20 mounted in the case 10, and a side button module 50 attached to one side of the case 10.

Figure 3:
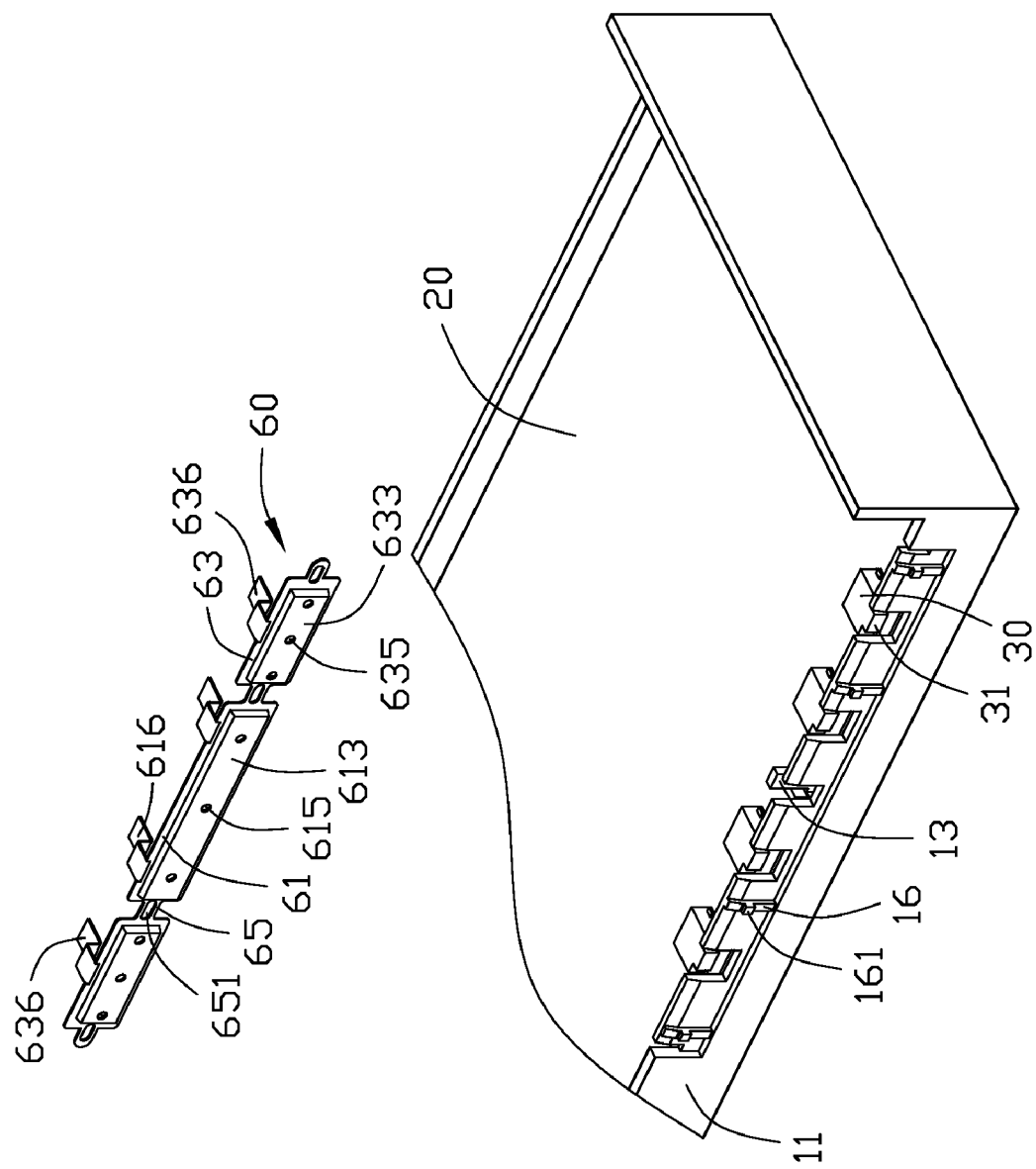
FIG. 3 is similar to FIG. 2, but viewed from another aspect.
Figure 4:
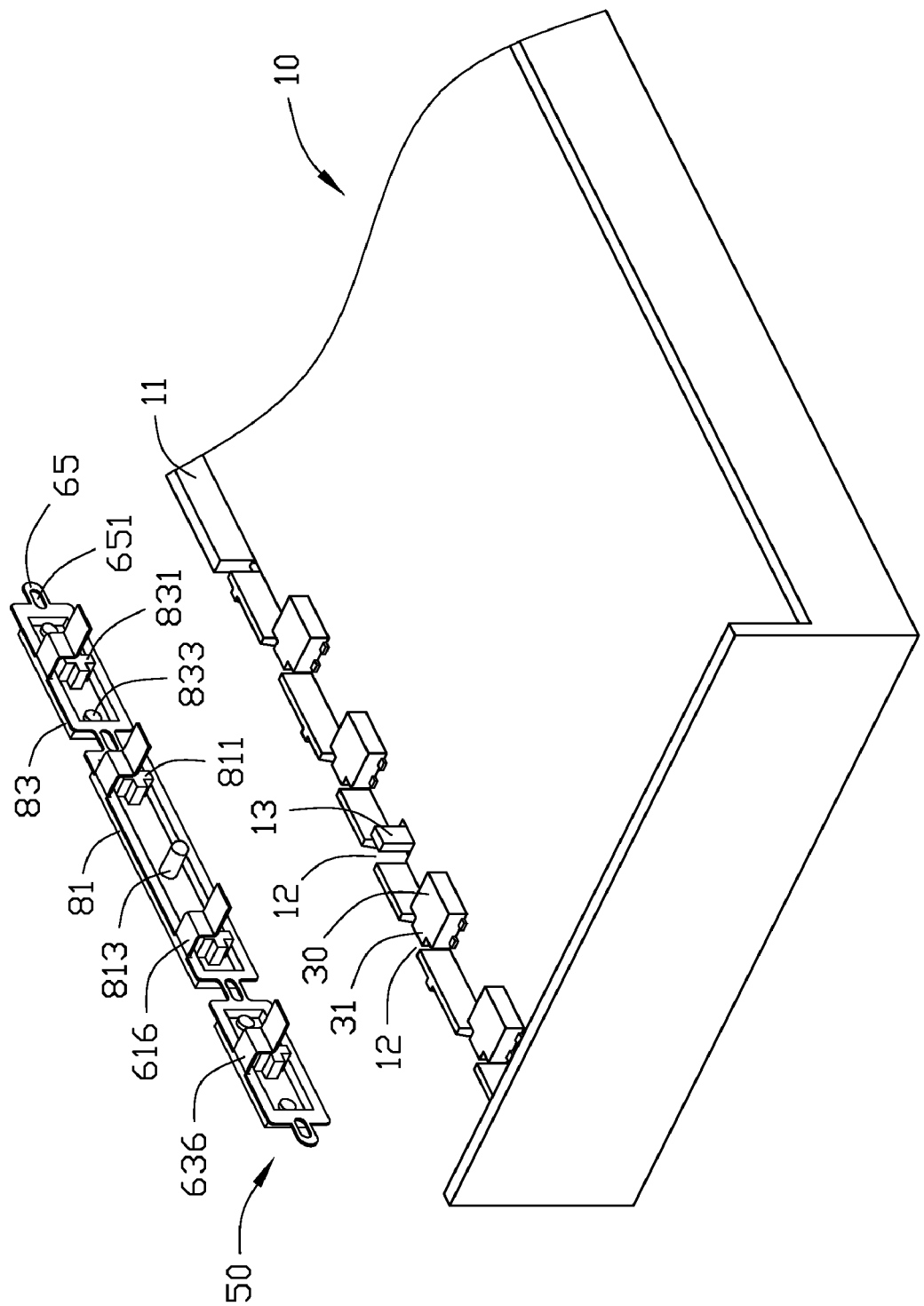
FIG. 4 is similar to FIG. 1, but showing the circuit board assembled in the case.
Figure 5:
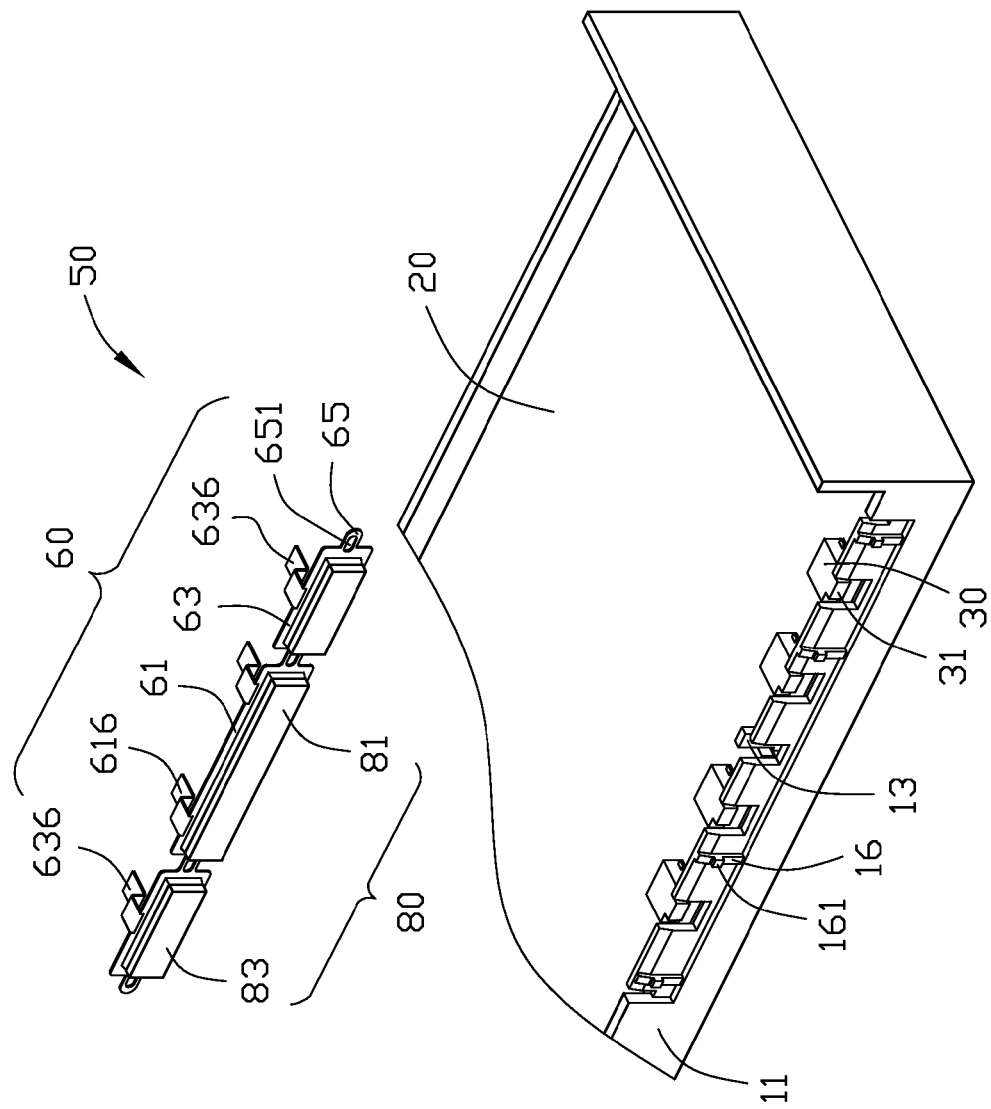
FIG. 5 is similar to FIG. 4, but viewed from another aspect.

The case 10 includes a bottom wall 19 and a sidewall 11 perpendicular to the bottom wall 19. The circuit board 20 is configured to be mounted on the bottom wall 19. A plurality of switches 30 electrically communicated with the circuit board 20 is arranged along one side of the circuit board 20 adjacent to the sidewall 11. Each switch 30 includes a laterally protruding switch head 31 configured to be pressed and thereby actuate the circuit board to generate a corresponding electrical signal. A supporting post 13 protrudes from the bottom wall 19. A cutout 21 is defined in the circuit board 20 between two of the switches 30, and configured for the supporting post 13 to extend through. The case sidewall 11 defines a first slot 12 corresponding to the supporting post 13, and a plurality of second slots 15 corresponding to the switch heads 31. A plurality of supporting ribs 16 protrudes from an outer surface of the sidewall 11, and a securing protrusion 161 (show in FIG. 3) projects from each supporting rib 16.

Referring to FIGS. 2 to 5, the side button module 50 includes a positioning member 60, and a plurality of button sheets 80 configured for abutting the positioning member 60. The positioning member 60 is resiliently deformable. In the present embodiment, the positioning member may be made of metal material, and the buttons 80 may be made of plastic material. The positioning member 60 is configured to be secured on the sidewall 11 of the case 10.

The positioning member 60 includes a longer positioning piece 61, and two shorter positioning piece 63 connected to two sides of the longer positioning piece 61. A securing portion 65 extends from each side of the positioning pieces 61 and 63. The longer positioning piece 61 and the shorter positioning pieces 63 are connected by the securing portions 65. Each securing portion 65 defines a securing slot 651 configured for receiving the securing protrusion 161 on each supporting rib 16. The longer positioning piece 61 forms a mounting portion 613 opposite to the sidewall 11. A plurality of mounting holes 615 is defined in the mounting portion 613. Two bent tabs 616 extend from a top edge of the positioning piece 61, and are configured to abut two of the switches 30 so as to conduct static electricity on the positioning piece 61 to ground. Each shorter positioning piece 63 forms a mounting portion 633 protruding outside opposite to the sidewall 11. A plurality of mounting holes 635 is defined in the mounting portion 633. A bent tab 636 similar to the bent tab 616 extends from a top edge of each positioning piece 63 configured to abut on the other two switches 30.

The button sheets 80 are formed together with the positioning pieces 61 and 63 by holt melt technology. The button sheets 80 include a first button base 81 configured for abutting on the longer positioning piece 61, and two second button bases 83 configured for abutting on the short positioning pieces 63. Two actuating protrusions 811 protrude from the first button base 81, and are configured to abut the middle two switches 30. A pole 813 extends from the first button base 81 between the two actuating protrusions 811. An actuating protrusion 831 protrudes from each of the second button bases 83. The actuating protrusions 831 are configured to abut the other switches 30. Two securing protrusions 833 project from the second button base 83, and are located at two sides of the actuating protrusion 831. Each actuating protrusion 811 and 831 is cross shape. Each of the actuating protrusions 811 and 831, the pole 813, and the securing protrusions 833 extends through the corresponding mounting hole 615 or 635 by the hot melt technology. The actuating protrusions 811 and 831, the pole 813, and the securing protrusions 833 are formed to have sizes greater than the diameter of the corresponding mounting hole 615 or 635, so as to securely attach the button sheet 80 to the positioning member 60. The mounting portions 613 and 633 of the positioning pieces 61 and 63 are respectively sandwiched between the button base 810, 830 and the actuating protrusions 811, 831. Thus, the button sheet 80 and the positioning member 60 cooperatively form the side key button 50.

Figure 6:
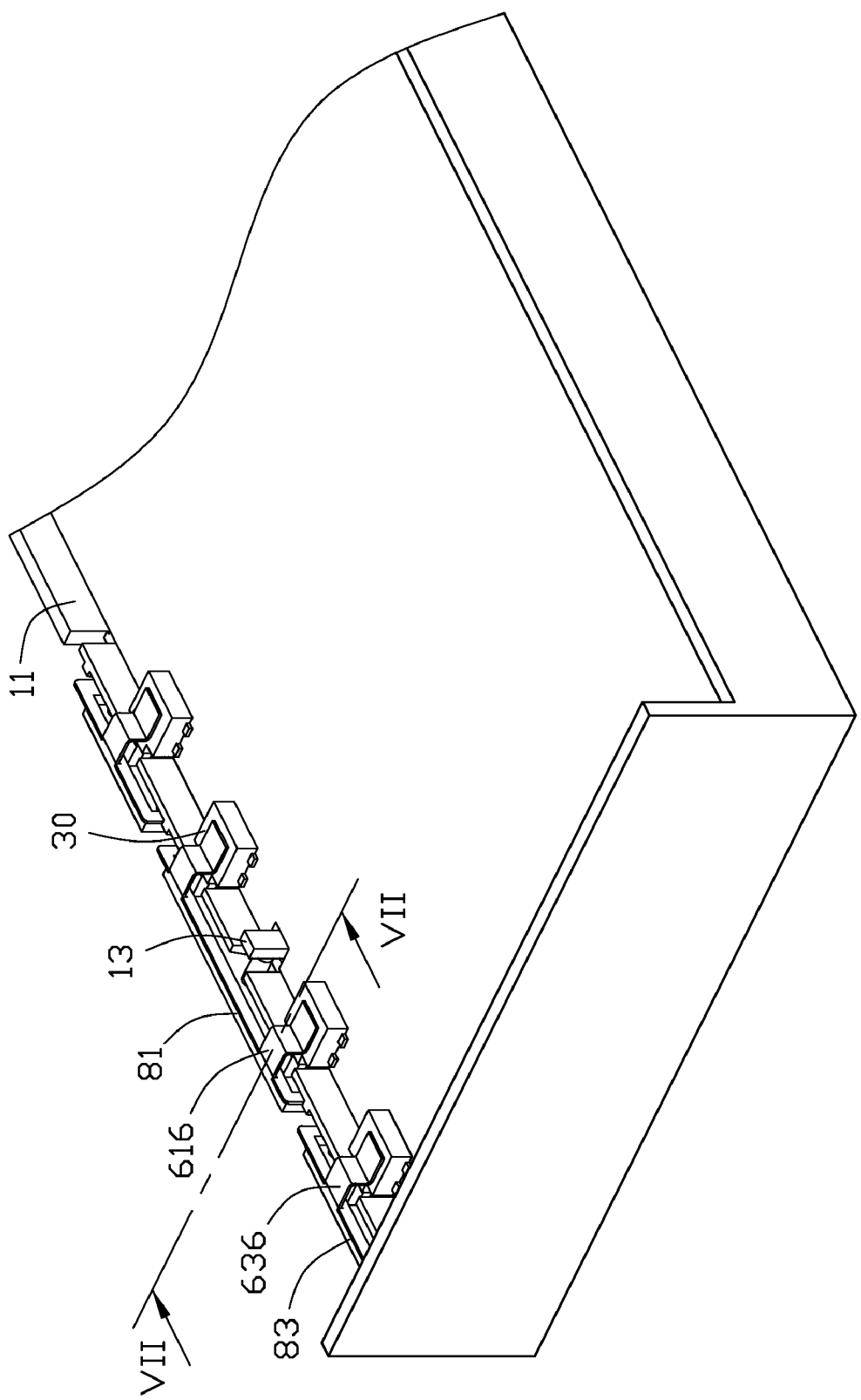
FIG. 6 is an assembled view of the mobile electronic device of FIG. 1.
Figure 7:
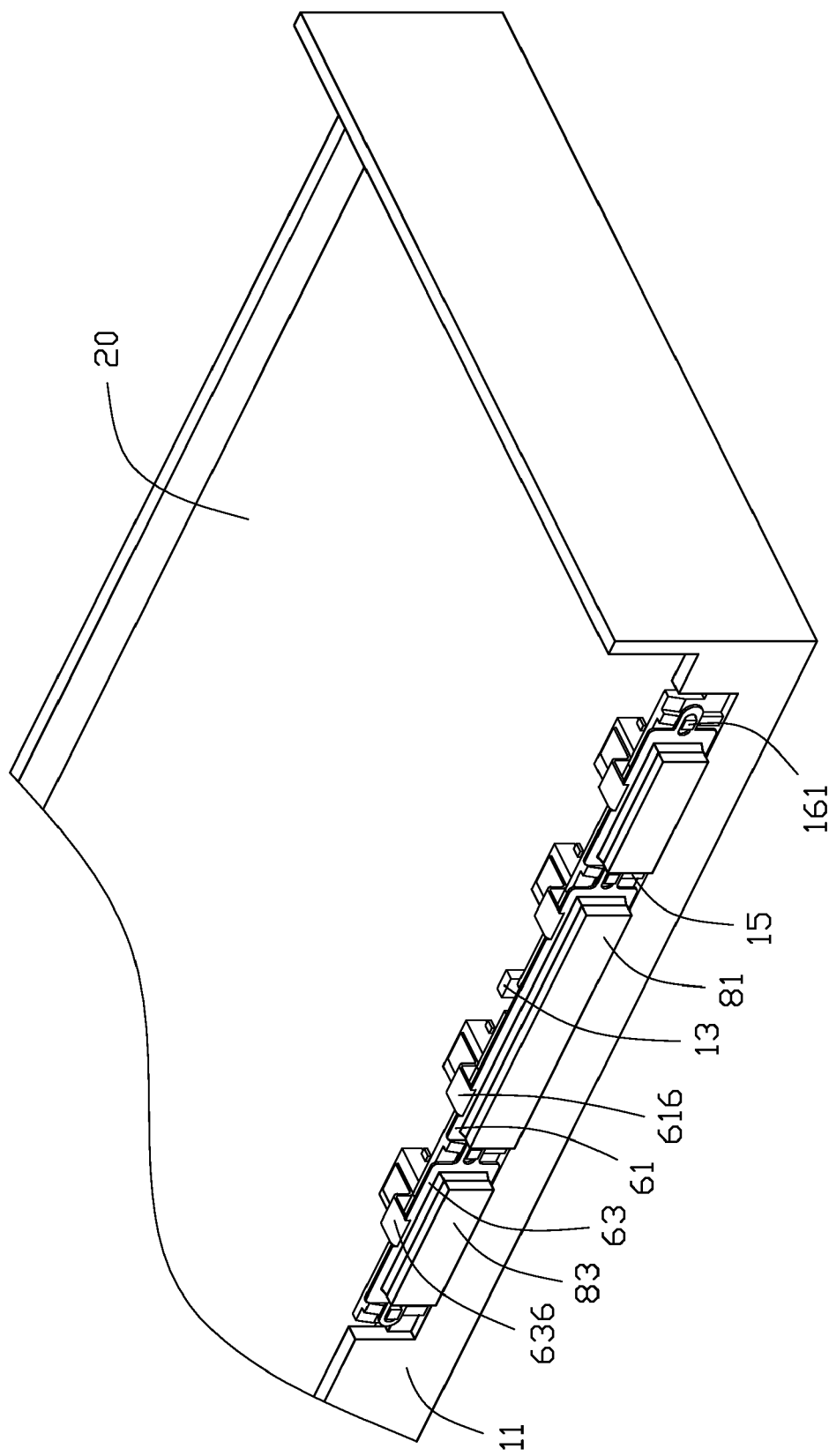
FIG. 7 is similar to FIG. 6, but viewed from another aspect.
Figure 8:
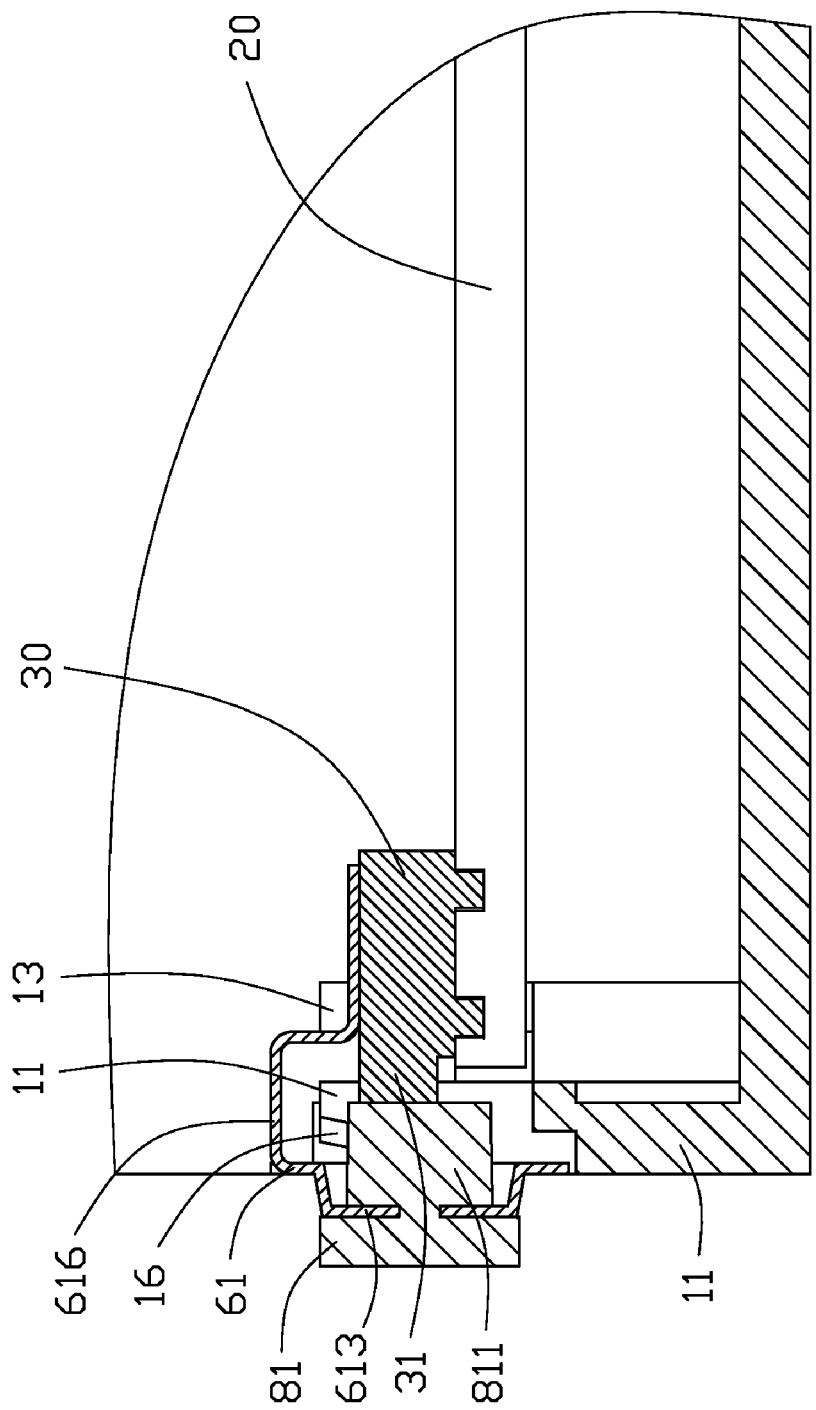
FIG. 8 is a partial cross-sectional view along the line VII-VII in FIG. 6.

Referring to FIGS. 6-8, in assembly, the circuit board 20 is received in the case 10. The supporting post 13 extends through the cutout 21 in the circuit board 20. The switches 30 are aligned with the second slots 15 in the case sidewall 11. The securing portions 65 of the positioning member 60 abut against the supporting ribs 16 on the sidewall 11, and the securing protrusions 161 of the supporting ribs 16 engage in the securing slots 651 of the securing portions 65. The actuating protrusions 811 and 831 abut the switch heads 31 of the switches 30. The pole 813 abuts the supporting post 13. When one actuating protrusion 811 of the button 81 is pressed to trigger a corresponding switch head 31, the pole 813 functions as a fulcrum so as to prevent the actuating of the other protrusion 811. The bent tabs 616 and 636 respectively abut the top surfaces of the switches 30 to conduct static electricity to ground.

When in use, one of the actuating protrusions 811 or 831 is pressed. The corresponding positioning piece 61 or 63 is deformed toward the sidewall 11 of the case 10, so that the switch head 31 of the corresponding switch 30 is activated by the actuating protrusion 811 or 831 to actuate the circuit board 20 to generate a corresponding electrical signal.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A mobile electronic device, comprising:
    a case comprising a sidewall;
    a circuit board mounted in the case, a switch located on the circuit board; and
    a side button module attached to the case sidewall, the side button module comprising:
        a positioning member secured to the case sidewall; and
        a button comprising a base abutting the positioning member and an actuating protrusion protruding from the base, the actuating protrusion extending through the positioning member and configured to trigger the switch when actuated;
        wherein two supporting ribs protrude from the case sidewall outer surface, a securing protrusion extends from each supporting rib, and the two securing portions abut against the supporting ribs and engage with the two securing protrusions.

2. The mobile electronic device of claim 1, wherein the positioning member defines a mounting hole, and the actuating protrusion extends through the mounting hole and is blocked by a periphery of the mounting hole.

3. The mobile electronic device of claim 2, wherein the actuating protrusion has a size greater than a diameter of the mounting hole.

4. The mobile electronic device of claim 1, wherein the case sidewall defines a slot, the switch comprises a switch head corresponding to the slot, and the switch head is configured to be depressed by the actuating protrusion.

5. The mobile electronic device of claim 1, wherein a bent tab extends from the positioning member, the bent tab abuts a top surface of the switch base so as to conduct static electricity to ground.

6. The mobile electronic device of claim 1, wherein the actuating protrusion is cross shape.

7. The mobile electronic device of claim 1, wherein the positioning member is made of metal material.

8. A mobile electronic device, comprising:
    a case comprising a sidewall;
    a circuit board mounted in the case, two switches located on the circuit board;
    a positioning member secured to the case sidewall; and
    a button comprising two actuating protrusions corresponding to the two switches, the actuating protrusions capable of triggering the switches;
    wherein two bent tabs extend from the positioning member, each bent tab abuts a top surface of the corresponding switch so as to conduct static electricity to ground.

9. The mobile electronic device of claim 8, wherein the button further comprises a base abutting the positioning member, and the actuating protrusions extends from the base, and the positioning member is located between the base and the actuating protrusions.

10. The mobile electronic device of claim 9, wherein the positioning member defines two mounting holes that the actuating protrusions extend through and is blocked by a periphery of the mounting hole.

11. The mobile electronic device of claim 10, wherein each of the actuating protrusions has a size greater than a diameter of the corresponding mounting hole.

12. The mobile electronic device of claim 8, wherein the case sidewall defines two slots corresponding to the two switches, each switch comprises a switch head corresponding to a slot, the switch heads are configured to be depressed by the actuating protrusions from the slots.

13. The mobile electronic device of claim 8, wherein two supporting ribs protrude from the case sidewall outer surface, a securing protrusion extends from each supporting rib, two securing portions extend from the positioning member, the securing portions abut against the supporting ribs and engage with the supporting rib securing protrusions.

14. The mobile electronic device of claim 8, wherein each actuating protrusion is cross shape.

15. The mobile electronic device of claim 8, wherein the positioning member is made of metal material.

16. The mobile electronic device of claim 1, wherein the positioning member is located between the base and the actuating protrusion.

17. The mobile electronic device of claim 8, wherein the case further comprises a bottom wall substantially perpendicular to the sidewall, a supporting post protrudes from the bottom wall between the two switches, a pole is located between the two actuating protrusions, and the pole abuts against the supporting post to function as a fulcrum when one of the actuating protrusions is pressed.

* * * * *